INVENTORS.
HEINRICH HOFFMAN
WERNER TRAUB

BY Dicke & Craig
ATTORNEYS

INVENTORS.
HEINRICH HOFFMAN
WERNER TRAUB

United States Patent Office 3,386,421
Patented June 4, 1968

3,386,421
AIR COMPRESSING INJECTION-TYPE
INTERNAL COMBUSTION ENGINE
Heinrich Hoffmann, Stuttgart-Geroksruhe, and Werner
Traub, Rommelshausen, Germany, assignors to
Daimler-Benz Aktiengesellschaft, Stuttgart-Unter-
turkheim, Germany
Filed Mar. 17, 1966, Ser. No. 535,243
Claims priority, application Germany, Mar. 20, 1965,
D 46,858
5 Claims. (Cl. 123—32)

ABSTRACT OF THE DISCLOSURE

An air compressing, injection-type internal combustion engine having a swirling inflow of the combustion air into a substantially axially symmetrical combustion space arranged principally within an insert of the piston, whose lateral wall is provided with an enlargement extending outwardly forming an annular radial shoulder, with the fuel being injected into the area of the enlargement against the lateral wall by means of a fixed nozzle approximately in the flow direction of the air in a substantially flat or shallow manner.

Background of the invention

On the basis of well known prior recognitions, a more complete combustion and softer operation with such injection-type internal combustion engines can be achieved in that the fuel during normal engine operation is not injected directly into the hot combustion space zones but instead initially against relatively cooled wall parts of the combustion space so that the fuel, prior to its combustion, has to be at first separated again from the wall and evaporated.

However, it has been found with such prior art constructions to be still disadvantageous that notwithstanding the injection against the wall still considerable fuel portions are able to reach the bottom portion and from there into the hot center core of the combustion space filling instantaneously with combustion gases, which can be traced back above all to the secondary flow of the combustion air occurring in axially symmetrical combustion spaces in the presence of an air-swirl about the cylinder axis, which carries or drags along fuel particles along the side wall of the combustion space in the downward direction and toward the center of the combustion space bottom as well as finally again axially into the center of the combustion space where the hot combusted gases collect and therefore a high temperature and lack of uncombusted combustion air prevail. It has been attempted heretofore to inject the fuel exclusively against the annularly shaped enlargement of a piston combustion space of the type described above. Apart from the fact that the known enlargement possesses only such a small annular surface that a limiting of the injection onto this annular surface is practically impossible, the inner rim or edge of this enlargement forms also such an acute constriction of the combustion space as seen in cross section that one has to accept, on the one hand, disturbing throttle losses of the inflowing combustion air and, on the other, over-heated rim spots of the constriction places, which can be cooled only relatively poorly.

Summary of the invention

The present invention aims at avoiding the aforementioned shortcomings and to limit the mixture formation of the injected fuel completely to the lateral wall area of the piston combustion space.

The aim and underlying problems of the present invention are solved in accordance with the present invention essentially by the construction and formation of the combustion space with an annular shoulder extending outwardly from the central cylindrical lateral wall region at an approximately right angle, which is adjoined by the outer lateral wall area by way of an axially symmetrical rounded-off portion of the outer annular shoulder area, and furthermore by a plug-type nozzle injecting the fuel as shallow or flat as possible against the outer lateral wall area and the ring shoulder.

With such an injection of the fuel against the lateral wall area disposed above the annular shoulder, the essential portion of the fuel can be retained above the annular shoulder where the rotating uncombusted combustion air sweeps past continuously and thereby assures a good mixture formation up to the utilization of the entire air quantity.

According to a preferred construction of the present invention, the piston is provided with a channel-shaped injection aperture or recess terminating approximately tangentially, and at the same time downwardly inclined in the combustion space portion disposed above the annular shoulder whereby the inclination of the injection aperture with respect to the piston axis which coincides with the inclination of the plug-type nozzle amounts to about 52°.

However, the aim of the present invention can also be solved in that the plug-type nozzle is arranged in a tangential plane of the combustion space, especially if constructed in the manner described above, and at the same time is also arranged approximately within a cross plane of the working cylinder at the latter and in that the piston is provided with a channel which is in alignment with the injection direction of the plug-type nozzle in the region of its upper dead-center position and which leads tangentially into the combustion space.

With such an injection arrangement, the fuel reaches principally the lateral wall area of the combustion space already as a result of the injection direction of the plug-type nozzle inclined by about 90° with respect to the piston axis, where in conjunction with the rotating unused combustion air a good mixture formation is assured.

Accordingly, it is an object of the present invention to provide an air-compressing internal-type combustion engine of the type described above which eliminates by simple means the aforementioned shortcomings and drawbacks encountered in the prior art constructions.

It is another object of the present invention to provide an air-compressing injection-type internal combustion engine which brings about an improvement in the complete combustion and softer operation of the engine.

A further object of the present invention resides in a diesel injection-type combustion engine in which neither disturbing throttling losses of the inflowing combustion air nor local overheating in the combustion space have to be accepted to assure proper operation and complete combustion.

Still another object of the present invention resides in an air-compressing injection-type internal combustion engine in which the mixture formation of the injected fuel is limited completely to the lateral wall area of the piston combustion space.

Brief description of the drawing

These and further objects, features, and advantages of the present invention will become more obvious from the following description when taken in connection with the accompanying drawing which shows, for purposes of illustration only, two embodiments in accordance with the present invention, and wherein.

*Detailed description of the drawing*

Figure 1:
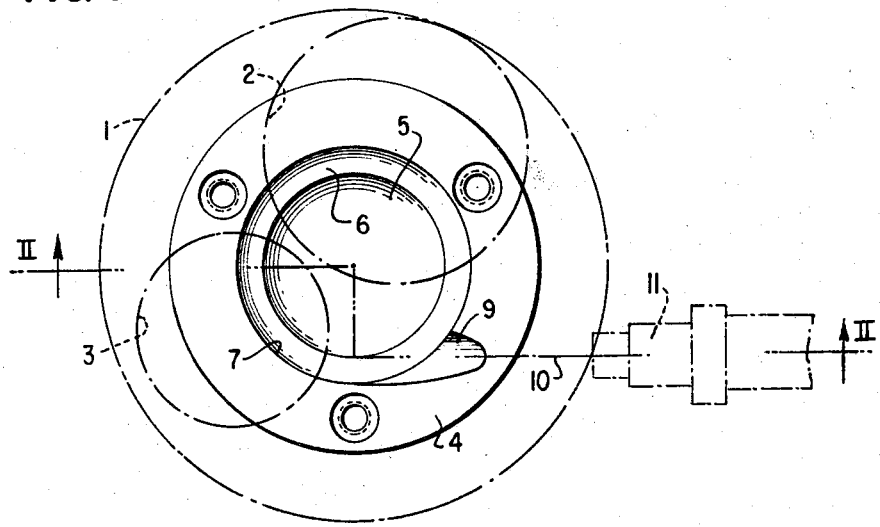
FIGURE 1 is a top plan view on a first embodiment of a piston of an internal combustion engine in accordance with the present invention.
Figure 2:
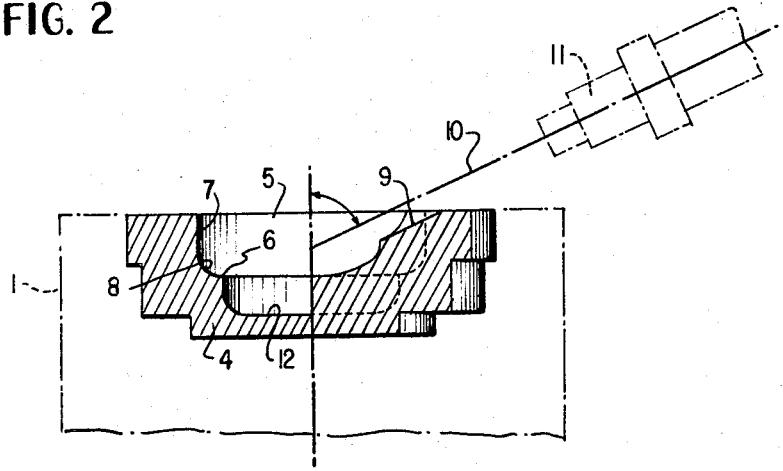
FIGURE 2 is a partial axial cross-sectional view taken along line II—II of FIGURE 1.

Referring now to the drawing wherein like reference numerals are used throughout the various views to designate like parts, and more particularly to FIGURES 1 and 2, the piston illustrated in these two figures forms a component part of a Diesel injection-type internal combustion engine of conventional construction and therefore not illustrated in details as to the rest thereof; the Diesel engine may operate, for example, according to the four-cycle principle whereby an inlet valve 2 and outlet valve 3 may be located within the cylinder head (not shown) above the piston as indicated in dash and dot lines in FIGURE 1.

The piston 1 is provided according to the illustrated embodiment of FIGURES 1 and 2 with an axial insert piece 4 which forms an axially symmetrical combustion space 5. As visible particularly clearly in FIGURE 2, the combustion space is provided with an annular shoulder 6 extending outwardly approximately rectangularly from its central cylindrical wall area. The shoulder 6 is adjoined by the outer lateral wall area 7 again of cylindrical configuration by way of a rounded-off portion 8 of axially symmetrical configuration of the outer annular shoulder area.

The insert piece 4 illustrated in FIGURES 1 and 2, is further provided with a channel-shaped injection aperture 9 terminating approximately tangentially and at the same time with a downward inclination in the combustion space portion disposed above the annular shoulder 6, the inclination of the injection aperture 9 with respect to the piston axis amounting to about 52°. Within the region of the upper dead-center position of the piston 1, the nozzle axis 10 of a conventional plug-type nozzle 11 arranged in any suitable manner in the cylinder head (not shown) is disposed slightly above the injection aperture 9 in a direction substantially parallel thereto so that the nozzle axis subtends with the piston axis an angle α of about 52° and the injected fuel is injected with its greatest portion exclusively against the combustion space part disposed above the annular shoulder 6 having a relatively cool wall temperature and at the same time in the direction of the rotating inflowing combustion air. The fuel is thereupon again separated from this combustion space part by the rotating combustion air sweeping past the same and then evaporates.

The annular shoulder 6 prevents the combustion air from tearing or dragging along fuel in the direction toward the combustion space bottom 12 by the secondary flow. Practically the entire fuel present in the upper combustion space part and in particular above the annular shoulder 6 thereby will be used in the mixture formation with the continuously successive outer layers of the rotating fresh combustion air, whereas the combustion gases formed after the initiation of the combustion remain in the axial center area of the combustion space by reason of the smaller specific weight thereof. It is prevented in particular by means of the annular shoulder 6 that still unmixed fuel is taken along by the secondary flow of the combustion air flowing in the direction toward the combustion space center and thereby reaches prematurely the particularly hot center core of the combustion space 5 which has no fresh air but only combustion gases.

Figure 3:
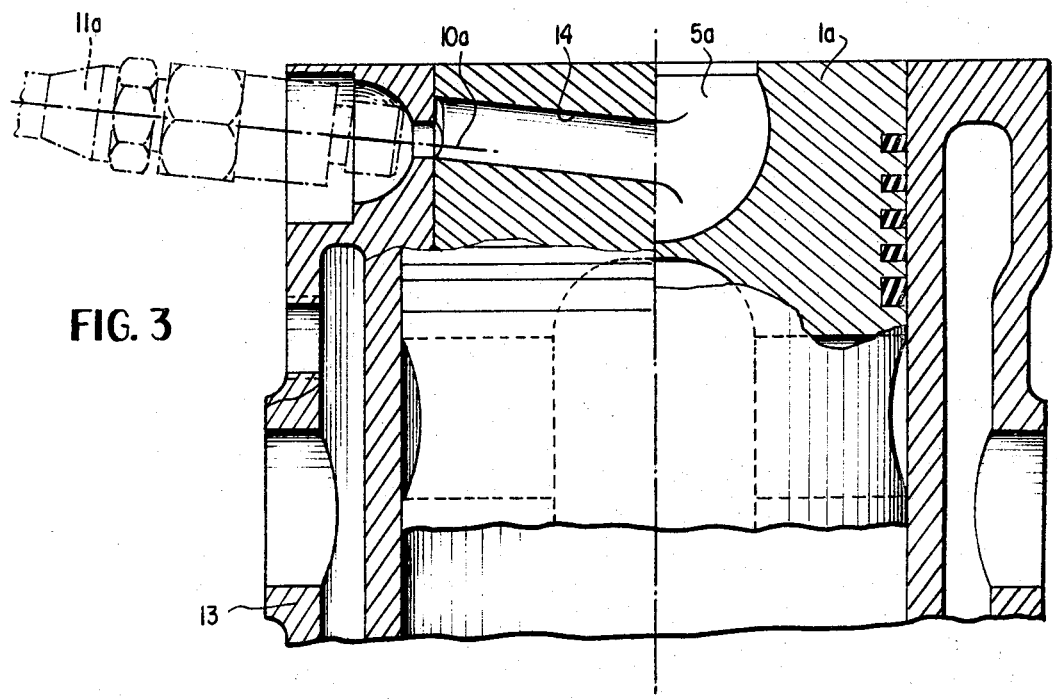
FIGURE 3 is a partial axial cross-sectional view through a second embodiment of an internal combustion engine in accordance with the present invention, taken along line III—III of FIGURE 4, and illustrating the piston in its upper dead-center position.
Figure 4:
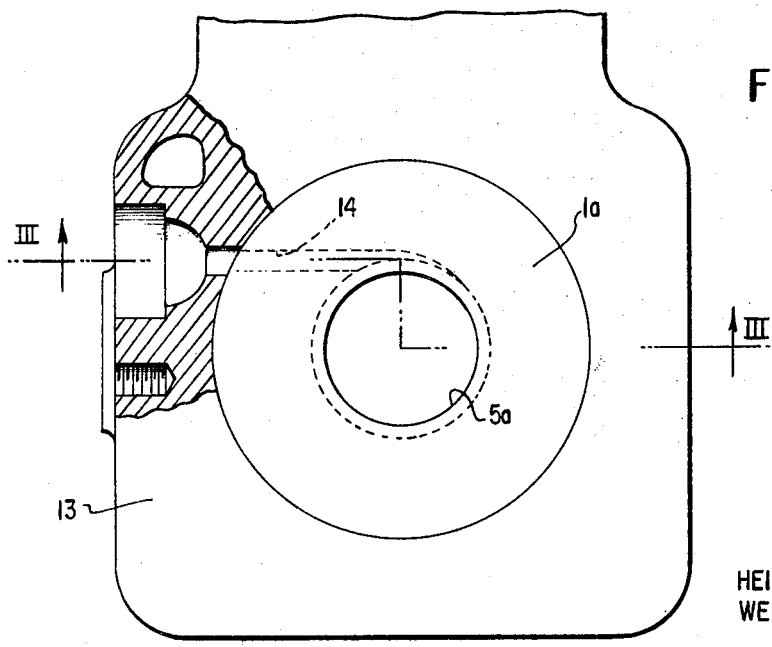
FIGURE 4 is a top plan view on the piston and cylinder of FIGURE 3 with parts thereof shown in cross section for the sake of greater clarity.

In the internal combustion engine illustrated in FIGURES 3 and 4 and corresponding to the second embodiment of the present invention, the plug-type nozzle 11a is arranged at the working cylinder 13 in a tangential plane of the combustion space 5a and at the same time approximately within a cross plane of the working cylinder 13 at the latter whereas the piston 1a is provided with a channel 14 substantially aligned with the injection direction 10a of the plug-type injection nozzle 11a within the region of its upper dead-center position and leading tangentially into the combustion space 5a. With such an arrangement of the plug-type nozzle 11a, the component of the fuel jet directed axially with respect to the piston 1a and/or to the combustion space 5a can be kept minimally small or approximately equal to zero, whence one no longer has to reckon in this case with the danger of taking or dragging along of uncombusted fuel into the hot axial area of the combustion space. Such a danger is still excluded even if the axis of the combustion space 5a is arranged exactly transversely to the axial direction 10a of the nozzle 11a with an axial direction 10a of the plug-type nozzle 11a axially inclined slightly toward the bottom side of the piston 1a in the illustrated embodiment.

While we have shown and described two embodiments in accordance with the present invention, it is understood that the same is not limited thereto but is susceptible of numerous changes and modifications as known to a person skilled in the art. Thus, the piston corresponding to the first embodiment does not necessarily have to be provided with an approximately tangentially extending injection aperture or recess even though such injection aperture is preferred. Furthermore, the combustion space of the second embodiment may be further provided with an annular shoulder according to the first embodiment of FIGURES 1 and 2 in order to further improve the aimed-at retention of the uncombusted fuel from the combustion space bottom and the hot combustion space core.

Accordingly, it is obvious that the present invention is not limited to the details shown and described herein, and we therefore do not wish to be limited thereto but intend to cover all such changes and modifications as are encompassed by the scope of the appended claims.

We claim:

1. An air-compressing internal combustion injection engine with swirling flow-in of the combustion air into a combustion chamber, which is provided mainly in the top of a piston and is substantially rotationally symmetrical with respect to an axis, in combination with the improvement comprising: the combustion chamber in the piston having a bottom first cylindrical side wall, an annular shoulder in the piston combustion chamber central region radially extending from said first cylindrical side wall toward the outside approximately perpendicular to said axis, an external top second cylindrical side wall correspondingly enlarged in diameter with respect to said first side wall and extending directly up to the top external rim of the piston combustion chamber, and an approximately quarter-rounded annular portion rotationally symmetrical with respect to said axis joining and forming a smooth transition between said second cylindrical side wall and said annular shoulder; and said piston having a channel-shaped injection recess in its top opening into the piston combustion chamber above the annular shoulder and oriented approximately tangentially to the piston combustion chamber and obliquely downwardly with respect to said axis.

2. The internal combustion engine according to claim 1, wherein said piston includes an insert piece defining the piston combustion chamber.

3. The internal combustion engine according to claim 2, wherein the insert piece is symmetrical and aligned with respect to the piston axis.

4. The internal combustion engine according to claim 3, wherein said piston combustion chamber consists of said first and second cylindrical side walls, said annular shoulder, said quarter-rounded portion, a bottom portion substantially perpendicular to said axis, and a transition portion between said bottom portion and said first cylindrical side wall.

5. The internal combustion engine according to claim 4, wherein said injection recess extends downwardly at at angle of approximately 52° with respect to said axis, and including an injection means having an injection axis parallel to and extending through said channel-shaped injection recess for injecting fuel against said second cylindrical side wall.

References Cited

UNITED STATES PATENTS

| | | | |
|---|---|---|---|
| 2,172,170 | 9/1939 | Megroot | 123—32 |
| 2,762,348 | 9/1956 | Meurer | 123—32 |
| 2,873,727 | 2/1959 | Meurer | 123—32 |
| 2,907,308 | 10/1959 | Meurer et al. | 123—32 |
| 2,942,591 | 6/1960 | Meurer | 123—32 |
| 2,942,592 | 6/1960 | Meurer | 123—32 |

LAURENCE M. GOODRIDGE, *Primary Examiner.*